March 30, 1926. 1,578,541
V. P. MATHEWS
MOTOR VEHICLE FENDER GUARD
Filed July 29, 1925

Inventor
Verner P. Mathews
By Kwis Hudson & Kent
Attorneys

Patented Mar. 30, 1926.

1,578,541

UNITED STATES PATENT OFFICE.

VERNER P. MATHEWS, OF CLEVELAND, OHIO, ASSIGNOR TO THE EATON AXLE AND SPRING COMPANY, OF CLEVELAND, OHIO, A CORPORATION OF OHIO.

MOTOR-VEHICLE FENDER GUARD.

Application filed July 29, 1925. Serial No. 46,706.

*To all whom it may concern:*

Be it known that I, VERNER P. MATHEWS, a citizen of the United States, residing at Cleveland, in the county of Cuyahoga and State of Ohio, have invented a certain new and useful Improvement in Motor-Vehicle Fender Guards, of which the following is a full, clear, and exact description.

This invention relates to guards for the fenders of vehicles and more particularly to guards for the rear fenders. It is one of the objects of the invention to provide a strong construction that will be readily applicable to existing vehicles and which will present a relatively wide impact surface so as to more effectively protect the fenders than the relatively narrow guards that have been heretofore used. A further object of the invention is to provide a guard that is so designed that it may be economically manufactured. A further object of the invention is to provide a guard, of the type referred to, that will present an attractive appearance and be more or less ornamental as well as serve to protect the rear fenders of the vehicle.

Other objects of the invention and the features of novelty will be apparent with the following description taken in connection with the accompanying drawings, of which:

Figure 1:
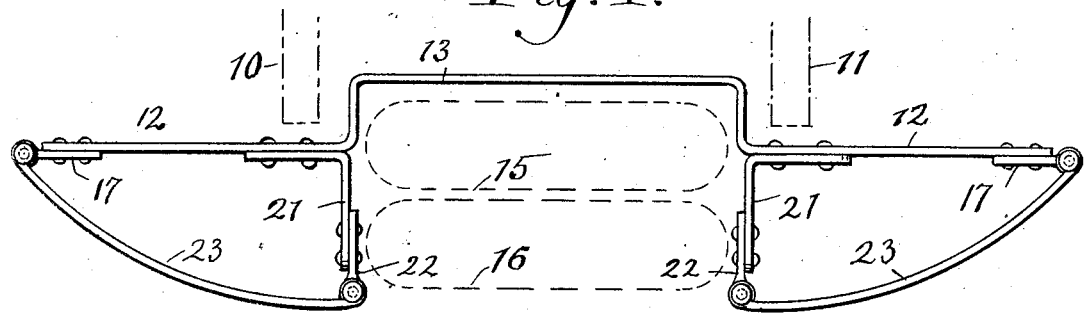
Figure 1 is a plan view of a fender guard construction embodying my invention.
Figures 2, 3:
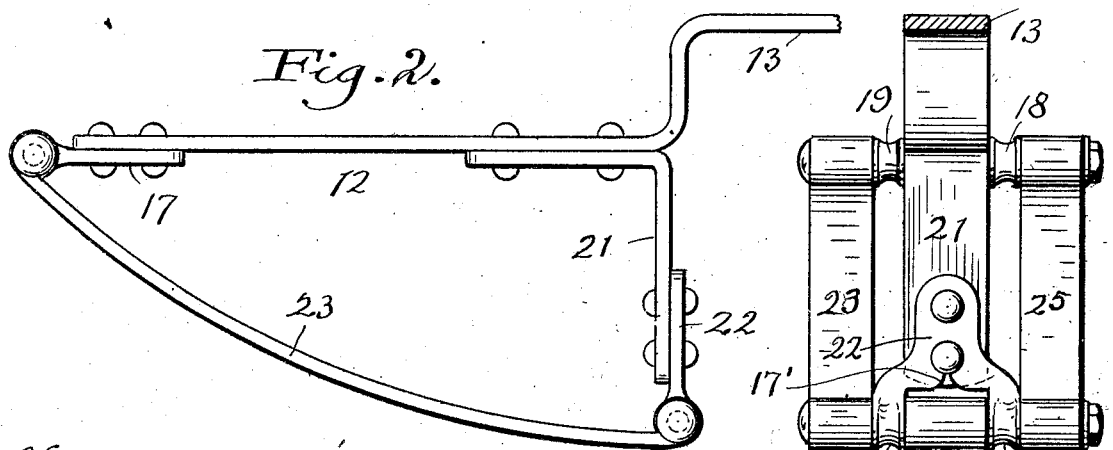
Figure 2 is an enlarged fragment of Figure 1.
Figure 3 is an end elevation of one of the fender guards, as seen from the right of Figure 2.
Figure 4:
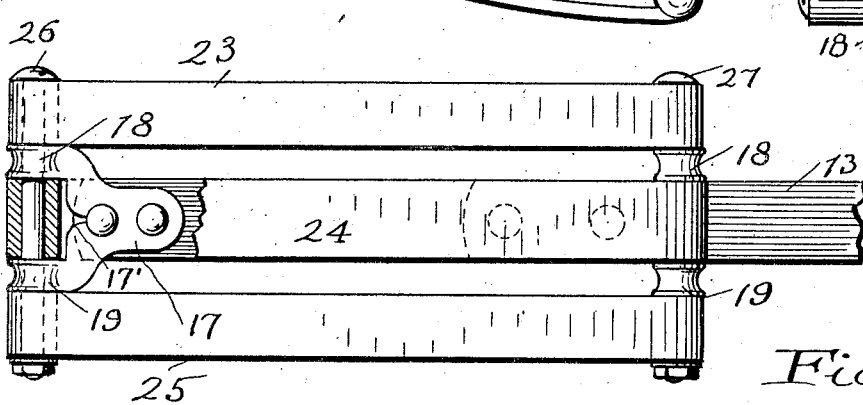
Figure 4 is a rear elevation of the structure shown in Figure 2.
Figure 5:
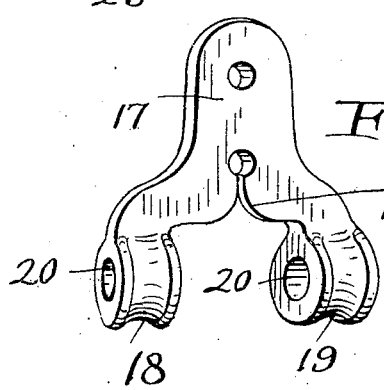
Figure 5 is a perspective view of one of the elements of the construction illustrated in Figures 1 to 4.

In Figure 1, I have illustrated, at 10 and 11, diagrammatically, the side members of a vehicle frame to which is attached the transversely extending bar 12 having the forwardly off-set central portion 13 to provide space for spare tires which are indicated at 15 and 16. Brackets 17 are secured to the ends of the bar 12 by riveting or in any other suitable manner, these brackets being best shown in Figure 5 and comprising the vertically spaced arms 18 and 19 which are provided with bolt openings 20. Said brackets 17 are also split as shown at 17′ for a purpose to be hereinafter described. Angle-brackets having rearwardly projecting arms 21 are secured to the bar 12, as shown, and have secured thereon brackets 22 which are similar to the brackets 17. Two series of impact bars are arranged on opposite sides of the central space for the spare tires 15 and 16, there being three of these impact bars in vertical alignment, in each series, as indicated at 23, 24 and 25. Each of these impact bars is outwardly curved and provided with eyes at its ends to be aligned with the openings 20 in the brackets 17 and 22 and connected therewith by the bolts 26 and 27. As will be seen from Figure 4, the eyes at the ends of the bar 24 are arranged between the arms 18 and 19 of the brackets 17 and 22, and when the bolts 26 and 27 are tightened the splits 17′ permit the arms 18 and 19 to be drawn toward each other and securely clamp the eyes at the ends of the bar 24, the impact bar 23 being arranged above these brackets and the bar 25 being arranged below them. The relative arrangement of the two series of impact bars is clearly shown in Figure 1.

Having thus described my invention, I claim:

1. In motor vehicle fender guards, the combination of a bar to be attached to the vehicle frame, an arm projecting from said bar longitudinally of the vehicle, brackets at the outer ends of said bar and said brackets having vertically spaced yieldable arms with aligned eyes therein, three vertically aligned bars having eyes at their ends arranged in vertical alignment with the first-mentioned eyes, and bolts extending through said aligned eyes and whereby said three bars are secured to said brackets.

2. In motor vehicle fender guards, the combination of a bar to be attached to the vehicle frame, an arm projecting from said bar longitudinally of the vehicle, brackets at the outer ends of said bar and said brackets having vertically spaced yieldable arms with aligned eyes therein, an impact bar having eyes at its ends arranged between the arms of said brackets, impact bars arranged above and below the first-mentioned impact bar and having eyes at their ends aligned with the aforementioned eyes, and bolts for securing said aligned eyes together.

3. In motor vehicle fender guards, the combination of a bar extending transversely of the vehicle and to be attached to the vehicle frame, brackets on the ends of said bar having vertically spaced yieldable arms with aligned eyes therein, arms secured to said bar intermediate its ends and projecting longitudinally of the vehicle, brackets similar to the first-mentioned brackets secured to the ends of the last-mentioned arms, two series of impact bars, each series comprising three vertically aligned bars having eyes at their ends, said impact bars being symmetrically arranged on opposite sides of the vehicle and the respective series extending from the brackets at the ends of the first-mentioned bar to the brackets on said second-mentioned arms, and bolts extending through the eyes of said impact bars and said brackets for securing the same together.

In testimony whereof, I hereunto affix my signature.

VERNER P. MATHEWS.